(12) United States Patent
Dhingra

(10) Patent No.: US 6,645,462 B1
(45) Date of Patent: Nov. 11, 2003

(54) SYNTHETIC POROUS CRYSTALLINE MCM-71, ITS SYNTHESIS AND USE

(75) Inventor: Sandeep Singh Dhingra, Robbinsville, NJ (US)

(73) Assignee: Exxon Mobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/705,571

(22) Filed: Nov. 3, 2000

(51) Int. Cl.[7] ............................................. C01B 39/50
(52) U.S. Cl. ........................ 423/718; 423/700; 423/705; 208/46
(58) Field of Search ................................ 423/700, 705, 423/718; 208/46

(56) References Cited

U.S. PATENT DOCUMENTS

| | | | |
|---|---|---|---|
| 5,013,536 A | * | 5/1991 | Vaughan et al. |
| 5,397,560 A | * | 3/1995 | Millar et al. ................ 423/700 |
| 5,882,624 A | * | 3/1999 | Kuznicki et al. ........... 423/700 |

* cited by examiner

*Primary Examiner*—David Sample

(57) ABSTRACT

This invention relates to a new synthetic porous crystalline material, designated MCM-71, a method for its preparation and its use in catalytic conversion of organic compounds. The new crystalline material exhibits a distinctive X-ray diffraction pattern and has a unique 3-dimensional channel system comprising generally straight, highly elliptical channels, each of which is defined by 10-membered rings of tetrahedrally coordinated atoms, intersecting with sinusoidal channels, each of which is defined by 8-membered rings of tetrahedrally coordinated atoms.

13 Claims, 6 Drawing Sheets

SYNTHETIC POROUS CRYSTALLINE MCM-71, ITS SYNTHESIS AND USE

BACKGROUND OF THE INVENTION

1. Field of the Invention

This invention relates to a novel synthetic porous crystalline material, MCM-71, to a method for its preparation and to its use in catalytic conversion of organic compounds.

2. Description of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIA element oxide, e.g., $AlO_4$, in which the tetrahedra are cross-linked by the sharing of oxygen atoms whereby the ratio of the total Group IIIA element, e.g., aluminum, and silicon atoms to oxygen atoms is 1:2. The electrovalence of the tetrahedra containing the Group IIIA element, e.g., aluminum, is balanced by the inclusion in the crystal of a cation, for example an alkali metal or an alkaline earth metal cation. This can be expressed wherein the ratio of the Group IIIA element, e.g., aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449), zeolite ZSM-20 (U.S. Pat. No. 3,972,983); ZSM-35 (U.S. Pat. No. 4,016,245); zeolite ZSM-23 (U.S. Pat. No. 4,076,842); zeolite MCM-22 (U.S. Pat. No. 4,954,325); and zeolite MCM-35 (U.S. Pat. No. 4,981,663), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (Re. U.S. Pat. No. 29,948) discloses a porous crystalline silicate made from a reaction mixture containing no deliberately added alumina in the starting mixture and exhibiting the X-ray diffraction pattern characteristic of ZSM-5. U.S. Pat. Nos. 4,061,724; 4,073,865 and 4,104,294 describe crystalline silicates of varying alumina and metal content.

Many zeolites are synthesized in the presence of an organic directing agent, such as an organic nitrogen compound. For example, ZSM-5 may be synthesized in the presence of tetrapropylammonium cations and zeolite MCM-22 may be synthesized in the presence of hexamethyleneimine. It is also possible to synthesize zeolites and related molecular sieves in the presence of rigid polycyclic quaternary directing agents (see, for example U.S. Pat. Nos. 5,501,848 and 5,225,179), flexible diquaternary directing agents (Zeolites, [1994], 14, 504) and rigid polycyclic diquaternary directing agents (JACS, [1992], 114, 4195).

SUMMARY OF THE INVENTION

The present invention is directed to a novel porous crystalline material, named MCM-71, a method for its preparation, and the conversion of organic compounds contacted with an active form thereof. The calcined form of the porous crystalline material of this invention possesses a very high acid activity and exhibits a high sorption capacity. MCM-71 is reproducibly synthesized by the present method in high purity.

DESCRIPTION OF SPECIFIC EMBODIMENTS

Figure 1:
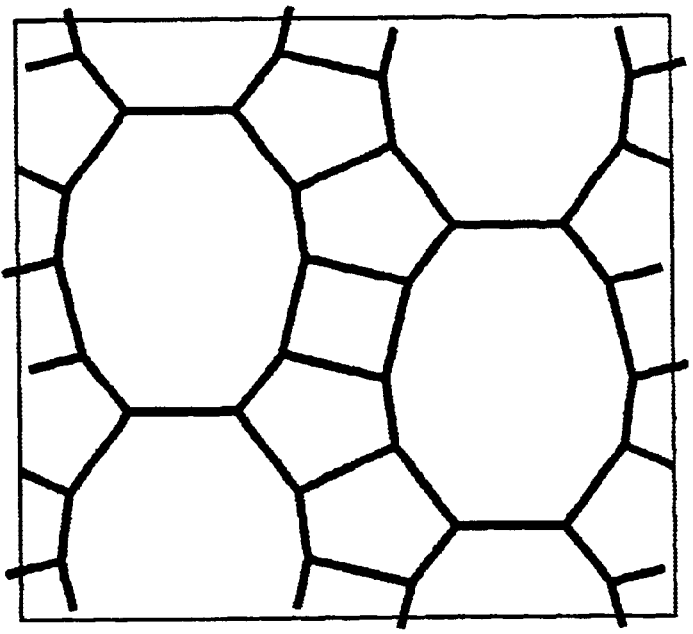
FIG. 1 is a plan view of the elliptical 10-membered ring channels of MCM-71.
Figure 2:
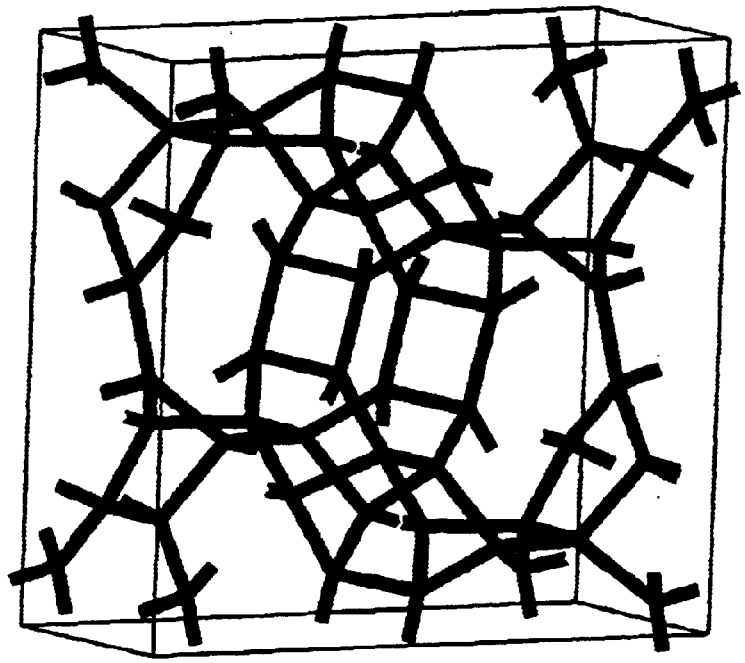
FIG. 2 is a three dimensional view of the pore structure of MCM-71 showing the tortuous 8-membered ring channels intersecting the elliptical 10-membered ring channels.

The synthetic porous crystalline material of this invention, MCM-71, is a single crystalline phase which has a unique 3-dimensional channel system comprising generally straight, highly elliptical channels, each of which is defined by 10-membered rings of tetrahedrally coordinated atoms, intersecting with sinusoidal channels, each of which is defined by 8-membered rings of tetrahedrally coordinated atoms. The 10-membered ring channels have cross-sectional dimensions of about 6.5 Angstrom by about 4.3 Angstrom, whereas the 8-membered ring channels have cross-sectional dimensions of about 4.7 Angstrom by about 3.6 Angstrom. The pore structure of MCM-71 is illustrated in FIGS. 1 and 2 (which show only the tetrahedral atoms), in which FIG. 1 is a plan view in the direction view of the elliptical 10-membered ring channels and FIG. 2 is a three dimensional view showing the toruous 8-membered ring channels intersecting the elliptical 10-membered ring channels.

The structure of MCM-71 may be defined by its unit cell, which is the smallest structural unit containing all the structural elements of the material. Table 1 lists the positions of each tetrahedral atom in the unit cell in nanometers; each tetrahedral atom is bonded to an oxygen atom which is also bonded to an adjacent tetrahedral atom. Since the tetrahedral atoms may move about due to other crystal forces (presence of inorganic or organic species, for example), a range of ±0.05 nm is implied for each coordinate position.

TABLE 1

| Number | Atom | x (Å) | y (Å) | z (Å) |
|---|---|---|---|---|
| 1 | Si1 | 3.721 | 1.856 | 8.420 |
| 2 | Si2 | 3.721 | 1.151 | 11.470 |
| 3 | Si3 | 1.540 | 4.009 | 8.190 |
| 4 | Si4 | 1.548 | 2.858 | 12.851 |
| 5 | Si5 | 3.721 | 7.424 | 18.010 |
| 6 | Si6 | 3.721 | 8.129 | 1.880 |
| 7 | Si7 | 5.901 | 5.271 | 17.780 |
| 8 | Si8 | 5.893 | 6.421 | 3.261 |
| 9 | Si9 | 3.721 | 11.135 | 1.170 |
| 10 | Si10 | 3.721 | 10.430 | 17.300 |
| 11 | Si11 | 5.901 | 13.288 | 1.400 |
| 12 | Si12 | 5.893 | 12.138 | 15.919 |
| 13 | Si13 | 3.721 | 16.703 | 10.760 |
| 14 | Si14 | 3.721 | 17.408 | 7.710 |
| 15 | Si15 | 1.540 | 14.550 | 10.990 |
| 16 | Si16 | 1.548 | 15.701 | 6.329 |
| 17 | Si17 | 5.901 | 14.550 | 10.990 |
| 18 | Si18 | 5.893 | 15.701 | 6.329 |
| 19 | Si19 | 1.540 | 13.288 | 1.400 |
| 20 | Si20 | 1.548 | 12.138 | 15.919 |
| 21 | Si21 | 1.540 | 5.271 | 17.780 |
| 22 | Si22 | 1.548 | 6.421 | 3.261 |
| 23 | Si23 | 5.901 | 4.009 | 8.190 |
| 24 | Si24 | 5.893 | 2.858 | 12.851 |
| 25 | Si25 | 0.000 | 11.135 | 8.420 |
| 26 | Si26 | 0.000 | 10.430 | 11.470 |
| 27 | Si27 | 5.261 | 13.288 | 8.190 |
| 28 | Si28 | 5.268 | 12.138 | 12.851 |
| 29 | Si29 | 0.000 | 16.703 | 18.010 |
| 30 | Si30 | 0.000 | 17.408 | 1.880 |
| 31 | Si31 | 2.180 | 14.550 | 17.780 |
| 32 | Si32 | 2.173 | 15.701 | 3.261 |
| 33 | Si33 | 0.000 | 1.856 | 1.170 |
| 34 | Si34 | 0.000 | 1.151 | 17.300 |
| 35 | Si35 | 2.180 | 4.009 | 1.400 |
| 36 | Si36 | 2.173 | 2.858 | 15.919 |
| 37 | Si37 | 0.000 | 7.424 | 10.760 |
| 38 | Si38 | 0.000 | 8.129 | 7.710 |
| 39 | Si39 | 5.261 | 5.271 | 10.990 |
| 40 | Si40 | 5.268 | 6.421 | 6.329 |
| 41 | Si41 | 2.180 | 5.271 | 10.990 |
| 42 | Si42 | 2.173 | 6.421 | 6.329 |
| 43 | Si43 | 5.261 | 4.009 | 1.400 |
| 44 | Si44 | 5.268 | 2.858 | 15.919 |
| 45 | Si45 | 5.261 | 14.550 | 17.780 |
| 46 | Si46 | 5.268 | 15.701 | 3.261 |
| 47 | Si47 | 2.180 | 13.288 | 8.190 |
| 48 | Si48 | 2.173 | 12.138 | 12.851 |

MCM-71 can be prepared in essentially pure form with little or no detectable impurity crystal phases. In its calcined form, MCM-71 has an X-ray diffraction pattern which, although resembling that of DCM-2 (disclosed in U.S. Pat. No. 5,397,550), is distinguished therefrom and from the patterns of other known as-synthesized or thermally treated crystalline materials by the lines listed in Table 2 below.

TABLE 2

| $d_{hkl}$ Å. | Relative Intensity |
|---|---|
| 9.57 ± 0.100 | w–s |
| 9.28 ± 0.070 | w–s |
| 8.35 ± 0.050 | m–s |

TABLE 2-continued

| $d_{hkl}$ Å. | Relative Intensity |
|---|---|
| 6.50 ± 0.040 | w–m |
| 5.26 ± 0.030 | w–m |
| 4.79 ± 0.030 | m–s |
| 4.18 ± 0.020 | vw–w |
| 3.75 ± 0.020 | w–m |
| 3.54 ± 0.020 | s–vs |
| 3.45 ± 0.014 | s–vs |
| 3.35 ± 0.010 | w |
| 3.14 ± 0.010 | vw–w |
| 2.95 ± 0.008 | vw–w |
| 1.86 ± 0.025 | vw |

These X-ray diffraction data were collected with a Scintag diffraction system, equipped with a germanium solid-state detector, using copper K-alpha radiation. The diffraction data were recorded by step-scanning at 0.02 degrees of two-theta, where theta is the Bragg angle, and a counting time of 10 seconds for each step. The interplanar spacings, d's, were calculated in Angstrom units, and the relative intensities of the lines, $I/I_0$ (where $I_0$ is one-hundredth of the intensity of the strongest line, above background), were derived with the use of a profile fitting routine (or second derivative algorithm). The intensities are uncorrected for Lorentz and polarization effects. The relative intensities are given in terms of the symbols vs=very strong (80–100), s=strong (60–80), m=medium (40–60), w=weak (20–40), and vw=very weak (0–20). It should be understood that diffraction data listed for this sample as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, crystal size and shape, preferred orientation and thermal and/or hydrothermal history.

The crystalline material of this invention has a composition involving the molar relationship:

$$X_2O_3:(n)YO_2,$$

wherein X is a trivalent element, such as aluminum, boron, iron, indium, and/or gallium, preferably aluminum; Y is a tetravalent element such as silicon, tin, titanium and/or germanium, preferably silicon; and n is at least about 2, such as 4 to 1000, and usually from about 5 to about 100. In the as-synthesized form, the material has a formula, on an anhydrous basis and in terms of moles of oxides per n moles of $YO_2$, as follows:

$$(0.1-2)M_2O:(0-2)Q:X_2O_3:(n)YO_2$$

wherein M is an alkali or alkaline earth metal, normally potassium, and Q is an organic moiety, normally triethanolamine. The M and Q components are associated with the material as a result of their presence during crystallization and it will be seen from the formula of the as-synthesized species that MCM-71 can be synthesized without an organic directing agent. The M and Q components are easily removed by post-crystallization methods hereinafter more particularly described.

The crystalline material of the invention is thermally stable and in the calcined form exhibits a high surface area (380 m²/g with micropore volume of 0.14 cc/g) and significant sorption capacity for water and hydrocarbons:

14.7 wt. % for water 8.4 wt. % for normal-hexane 5.4 wt. % for cyclohexane.

To the extent desired, the original sodium and/or potassium cations of the as-synthesized material can be replaced in accordance with techniques well known in the art, at least in part, by ion exchange with other cations. Preferred replacing cations include metal ions, hydrogen ions, hydrogen precursor, e.g., ammonium ions and mixtures thereof. Particularly preferred cations are those which tailor the catalytic activity for certain hydrocarbon conversion reactions. These include hydrogen, rare earth metals and metals of Groups IIA, IIIA, IVA, VA, IB, IIB, IIIB, IVB, VB, VIB, VIIB and VIII of the Periodic Table of the Elements.

When used as a catalyst, the crystalline material of the invention may be subjected to treatment to remove part or all of any organic constituent. This is conveniently effected by thermal treatment in which the as-synthesized material is heated at a temperature of at least about 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C. The thermally treated product, especially in its metal, hydrogen and ammonium forms, is particularly useful in the catalysis of certain organic, e.g., hydrocarbon, conversion reactions.

When used as a catalyst, the crystalline material can be intimately combined with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be in the composition by way of cocrystallization, exchanged into the composition to the extent a Group IIIA element, e.g., aluminum, is in the structure, impregnated therein or intimately physically admixed therewith. Such component can be impregnated in or on to it such as, for example, by, in the case of platinum, treating the silicate with a solution containing a platinum metal-containing ion. Thus, suitable platinum compounds for this purpose include chloroplatinic acid, platinous chloride and various compounds containing the platinum amine complex.

The crystalline material of this invention, when employed either as an adsorbent or as a catalyst in an organic compound conversion process should be dehydrated, at least partially. This can be done by heating to a temperature in the range of 200° C. to about 370° C. in an atmosphere such as air, nitrogen, etc. and at atmospheric, subatmospheric or superatmospheric pressures for between 30 minutes and 48 hours. Dehydration can also be performed at room temperature merely by placing the MCM-71 in a vacuum, but a longer time is required to obtain a sufficient amount of dehydration.

The present crystalline material can be prepared from a reaction mixture containing sources of alkali or alkaline earth metal (M) cation, normally potassium, an oxide of trivalent element X, e.g., aluminum and/or boron, an oxide of tetravalent element Y, e.g., silicon, and water, said reaction mixture having a composition, in terms of mole ratios of oxides, within the following ranges:

| Reactants | Useful | Preferred |
|---|---|---|
| $YO_2/X_2O_3$ | 2–100,000 | 5–100 |
| $H_2O/YO_2$ | 10–1000 | 20–50 |
| $OH^-/YO_2$ | 0.02–2 | 0.1–0.8 |
| $M/YO_2$ | 0.02–2 | 0.1–0.8 |

MCM-71 can be crystallized from a completely inorganic synthesis mixture or alternatively can be produced in the presence of an directing agent (Q), preferably triethanolamine. Where a directing agent is present, the molar ratio $Q/YO_2$ is typically 0.01–2.0 and preferably is 0.1–0.3.

Crystallization of MCM-71 can be carried out at either static or stirred conditions in a suitable reactor vessel, such as for example, polypropylene jars or teflon lined or stainless steel autoclaves, at a temperature of 100° C. to about 220° C. for a time sufficient for crystallization to occur at the temperature used, e.g., from about 5 hours to 30 days. Thereafter, the crystals are separated from the liquid and recovered.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

Synthesis of the new crystals may be facilitated by the presence of at least 0.01 percent, preferably 0.10 percent and still more preferably 1 percent, seed crystals (based on total weight) of crystalline product.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The crystalline material of this invention can be used to catalyze a wide variety of chemical conversion processes, particularly organic compound conversion processes, including many of present commercial/industrial importance. Examples of chemical conversion processes which are effectively catalyzed by the crystalline material of this invention, by itself or in combination with one or more other catalytically active substances including other crystalline catalysts, include those requiring a catalyst with acid activity.

Thus, in its active, hydrogen form MCM-71 exhibits a high acid activity, with an alpha value of 20 to 45. Alpha value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec-1). The Alpha Test is described in U.S. Pat. No. 3,354,078; in the *Journal of Catalysis*, 4, 527 (1965); 6, 278 (1966); and 61, 395 (1980), each incorporated herein by reference as to that description. The experimental conditions of the test used herein include a constant temperature of 538° C. and a variable flow rate as described in detail in the *Journal of Catalysis*, 61, 395 (1980).

As in the case of many catalysts, it may be desirable to incorporate the new crystal with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with the new crystal, i.e., combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, such as silica, zirconia, titania, magnesia, beryllia, alumina, and mixtures thereof.

In addition to the foregoing materials, the new crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following examples are presented.

EXAMPLE 1

Synthesis of Aluminosilicate MCM-71

7 g of Colloidal Silica (30 wt %), Al(OH)$_3$ (Aluminum Hydroxide, solid), KOH (Potassium Hydroxide, 20 wt % solution), triethanolamine and distilled water were combined in the following molar ratio:

| | |
|---|---|
| Si/Al$_2$ | 20 |
| H$_2$O/Si | 30 |
| OH/Si | 0.375 |

-continued

| | |
|---|---|
| K$^+$/Si | 0.375 |
| Triethanolamine/Si | 0.20 |

Figure 3:
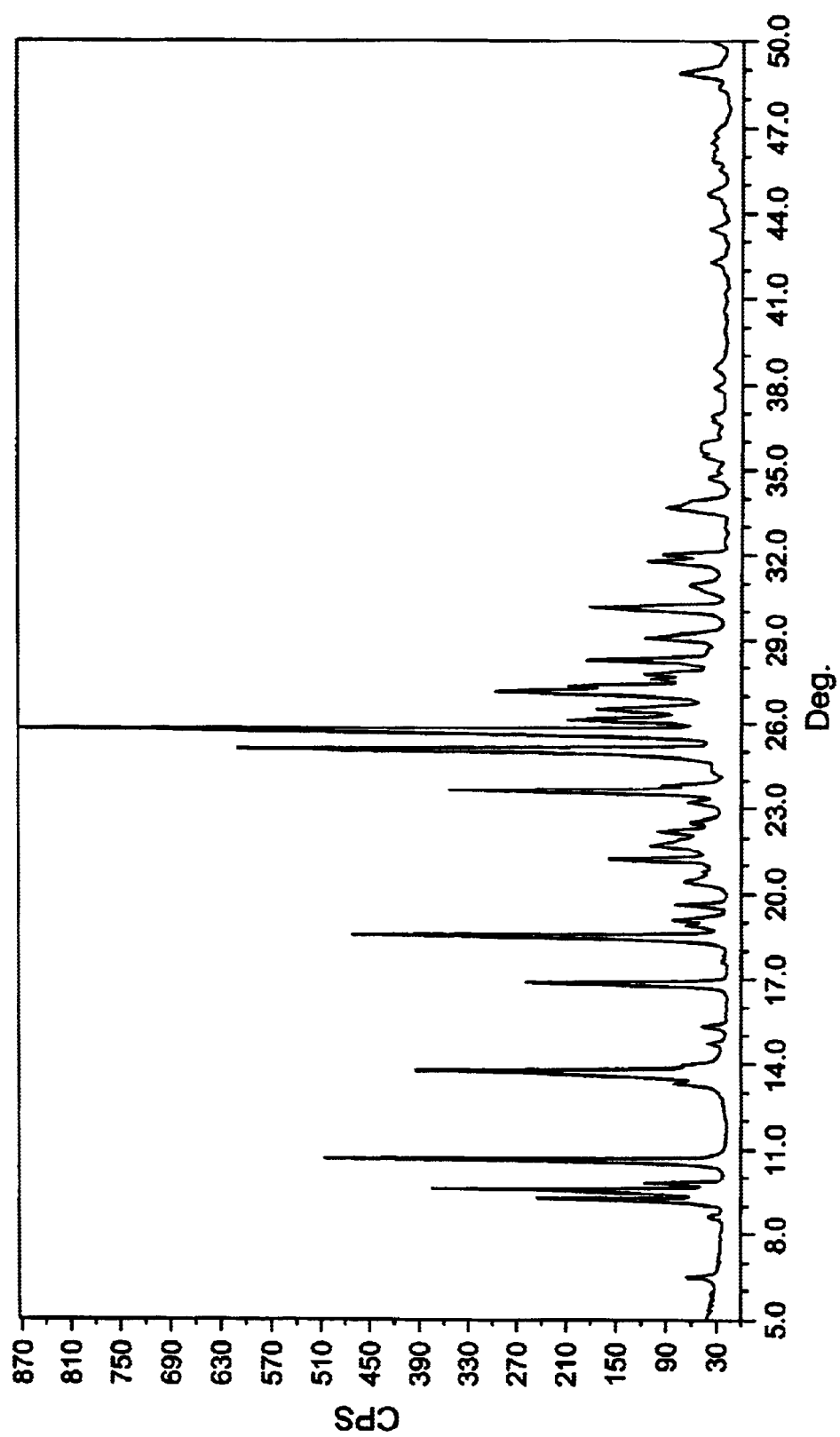
FIG. 3 shows the X-ray diffraction pattern of the as-synthesized product of Example 1.
Figure 4:
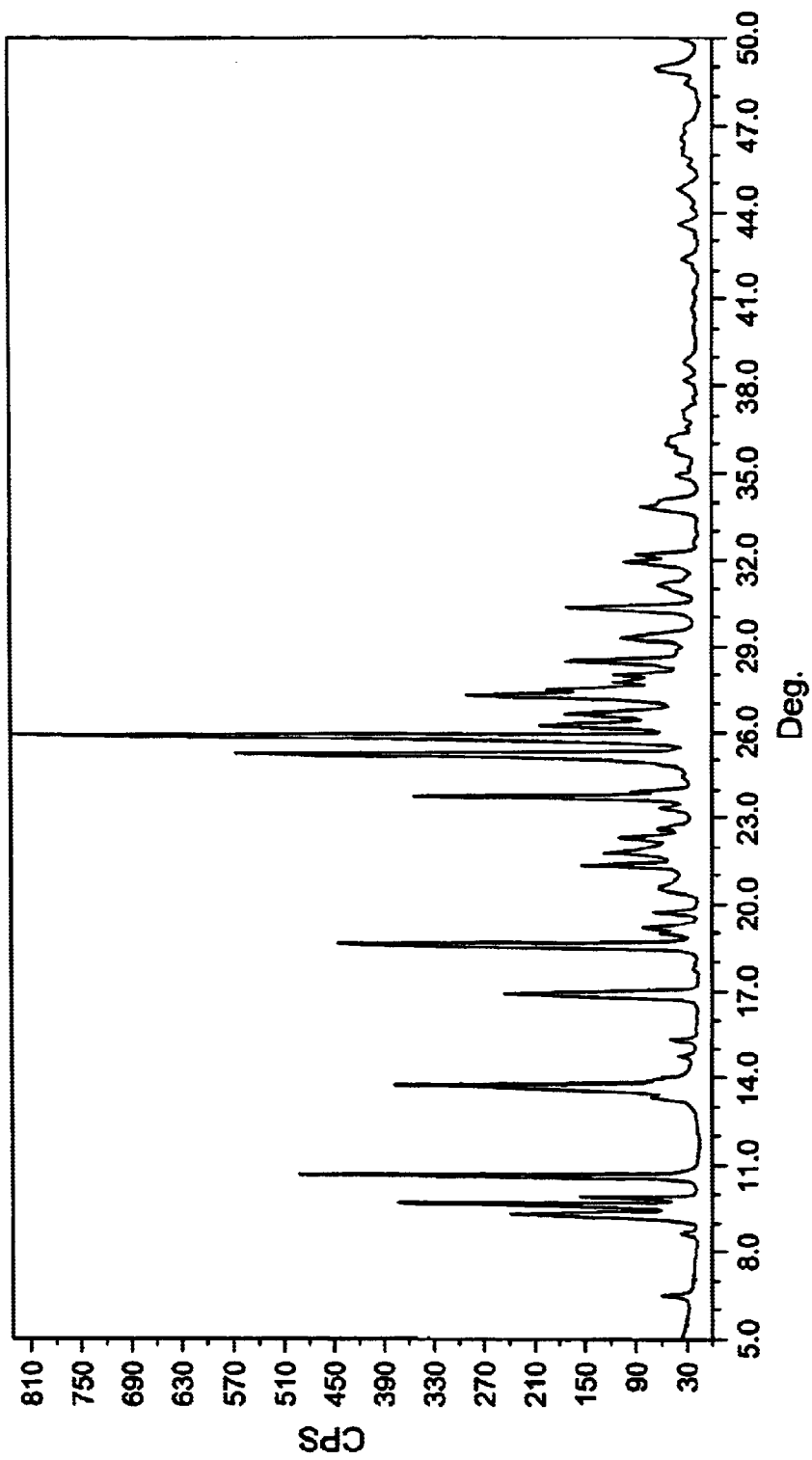
FIG. 4 shows the X-ray diffraction pattern of the as-calcined product of Example 1.

The combined mixture was added to an autoclave and heated to 160° C. for 368 hours and subsequently heated to 180° C. for 82 hours. The product was then filtered and washed with water and dried overnight under an IR lamp. The solid was then calcined in air at a temperature of 540° C. for 8 hours to yield the new material designated as MCM-71. The powder patterns of the as-synthesized and calcined materials are given in FIGS. 3 and 4 respectively, and show mordenite as an impurity phase (less than 5%). The as-synthesized material has the corresponding peak list as compiled in Table 3.

TABLE 3

| d$_{hkl}$ Å | 100 I$_o$/I$_{max}$ |
|---|---|
| 13.58* | 4.1 |
| 10.25* | 2.0 |
| 9.60 | 25.8 |
| 9.30 | 42.8 |
| 9.06* | 10.4 |
| 8.37 | 58.6 |
| 6.67 | 4.2 |
| 6.50 | 41.6 |
| 6.38* | >1.0 |
| 6.05* | 1.7 |
| 5.80* | 3.5 |
| 5.27 | 30.5 |
| 4.80 | 56.5 |
| 4.70 | 4.6 |
| 4.65 | 7.8 |
| 4.52 | 7.5 |
| 4.34* | 6.0 |
| 4.18 | 15.6 |
| 4.08* | 9.8 |
| 4.05* | 4.6 |
| 4.00 | 8.0 |
| 3.94 | 4.4 |
| 3.82 | 3.8 |
| 3.76 | 41.9 |
| 3.72 | 9.19 |
| 3.55 | 69.29 |
| 3.46 | 100.0 |
| 3.40 | 20.0 |
| 3.35 | 14.2 |
| 3.28 | 30.3 |
| 3.25 | 19.8 |
| 3.22* | 7.8 |
| 3.20 | 9.7 |
| 3.14 | 18.5 |
| 3.06 | 10.2 |
| 2.953 | 17.9 |
| 2.887* | 2.9 |
| 2.872 | 4.8 |
| 2.804 | 10.8 |
| 2.781 | 10.0 |
| 2.645 | 8.6 |
| 2.628 | 5.0 |
| 2.568 | 2.8 |
| 2.545 | 1.1 |
| 2.512 | 2.9 |
| 2.496 | 3.3 |
| 2.482 | 3.0 |
| 2.433 | 1.6 |
| 2.421 | 2.0 |
| 2.361 | 1.7 |
| 2.324 | 1.5 |
| 2.217 | >1.0 |
| 2.188 | >1.0 |
| 2.146 | >1.0 |
| 2.133 | 2.7 |

TABLE 3-continued

| $d_{hkl}$ Å | 100 $I_o/I_{max}$ |
|---|---|
| 2.077* | 2.7 |
| 2.049 | >1.0 |
| 2.023 | 2.8 |
| 1.987 | 1.5 |
| 1.972 | 2.7 |
| 1.961 | 2.4 |
| 1.950 | 2.4 |
| 1.935 | 2.1 |
| 1.917 | >1.0 |
| 1.878 | 1.7 |
| 1.861 | 7.5 |
| 1.824 | 2.0 |

*denotes a probable impurity peak

EXAMPLE 2

Synthesis of Aluminosilicate MCM-71

7 g of Colloidal Silica (30 wt %), Al(OH)$_3$ (Aluminum Hydroxide, solid), KOH (Potassium Hydroxide, 20 wt % solution), triethanolamine and distilled water were combined in the following ratio:

| | |
|---|---|
| Si/Al$_2$ | 21 |
| H$_2$O/Si | 30 |
| OH/Si | 0.375 |
| K$^+$/Si | 0.375 |
| Triethanolamine/Si | 0.20 |

Figure 5:
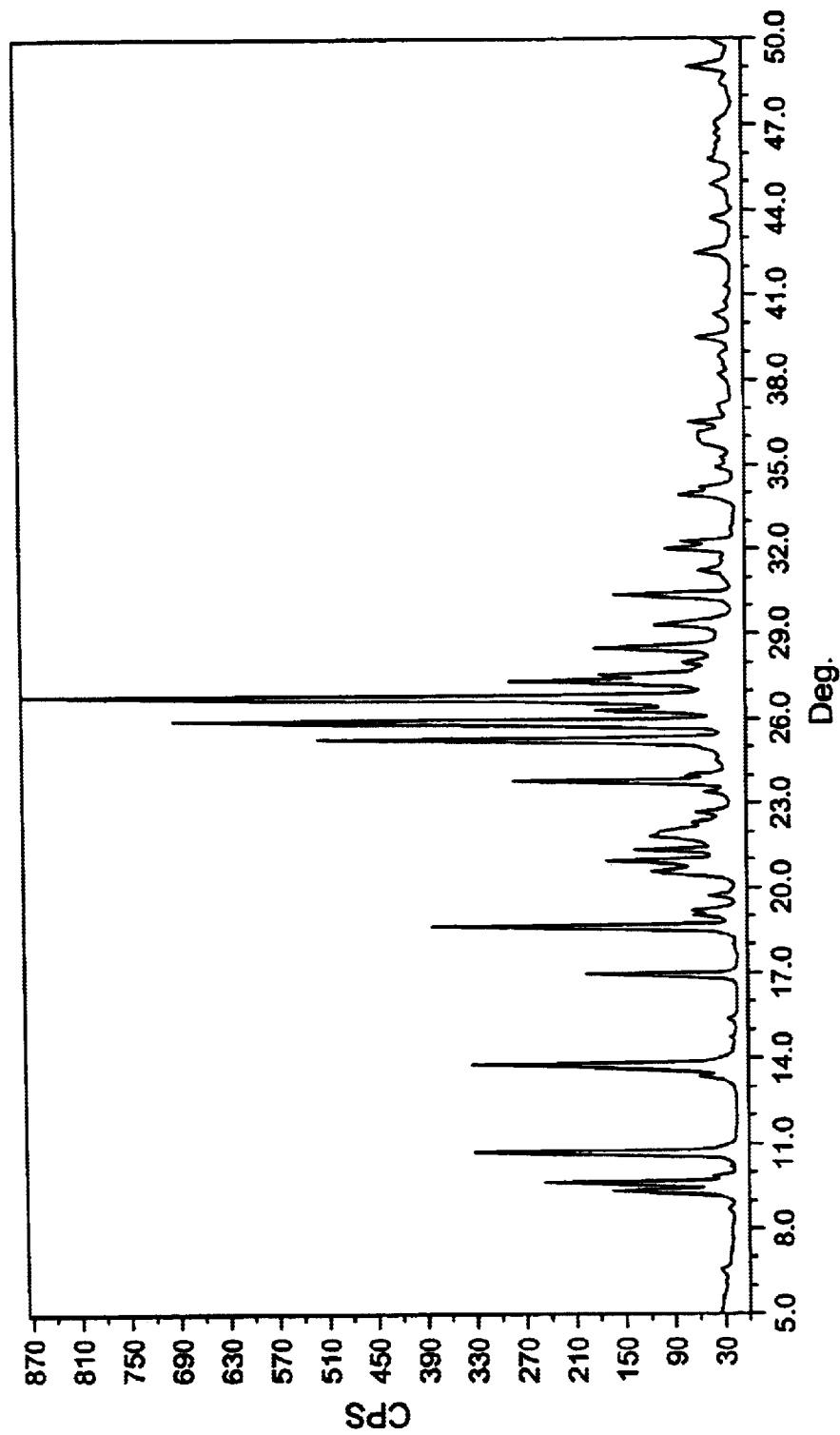
FIG. 5 shows the X-ray diffraction pattern of the as-synthesized product of Example 2.

The combined mixture was added to an autoclave and heated to 160° C. for 360 hours and subsequently heated to 180° C. for 120 hours. The product was then filtered and washed with water and dried overnight under an IR lamp. The powder pattern of the as-synthesized material is given in FIG. 5.

EXAMPLE 3

Synthesis of Aluminosilicate MCM-71

7 g of Colloidal Silica (30 wt %), Al(OH)$_3$ (Aluminum Hydroxide, solid), KOH (Potassium Hydroxide, 20 wt % solution) and distilled water were combined in the following ratio:

| | |
|---|---|
| Si/Al$_2$ | 20 |
| H$_2$O/Si | 30 |
| OH/Si | 0.375 |
| K$^+$/Si | 0.375 |

Figure 6:
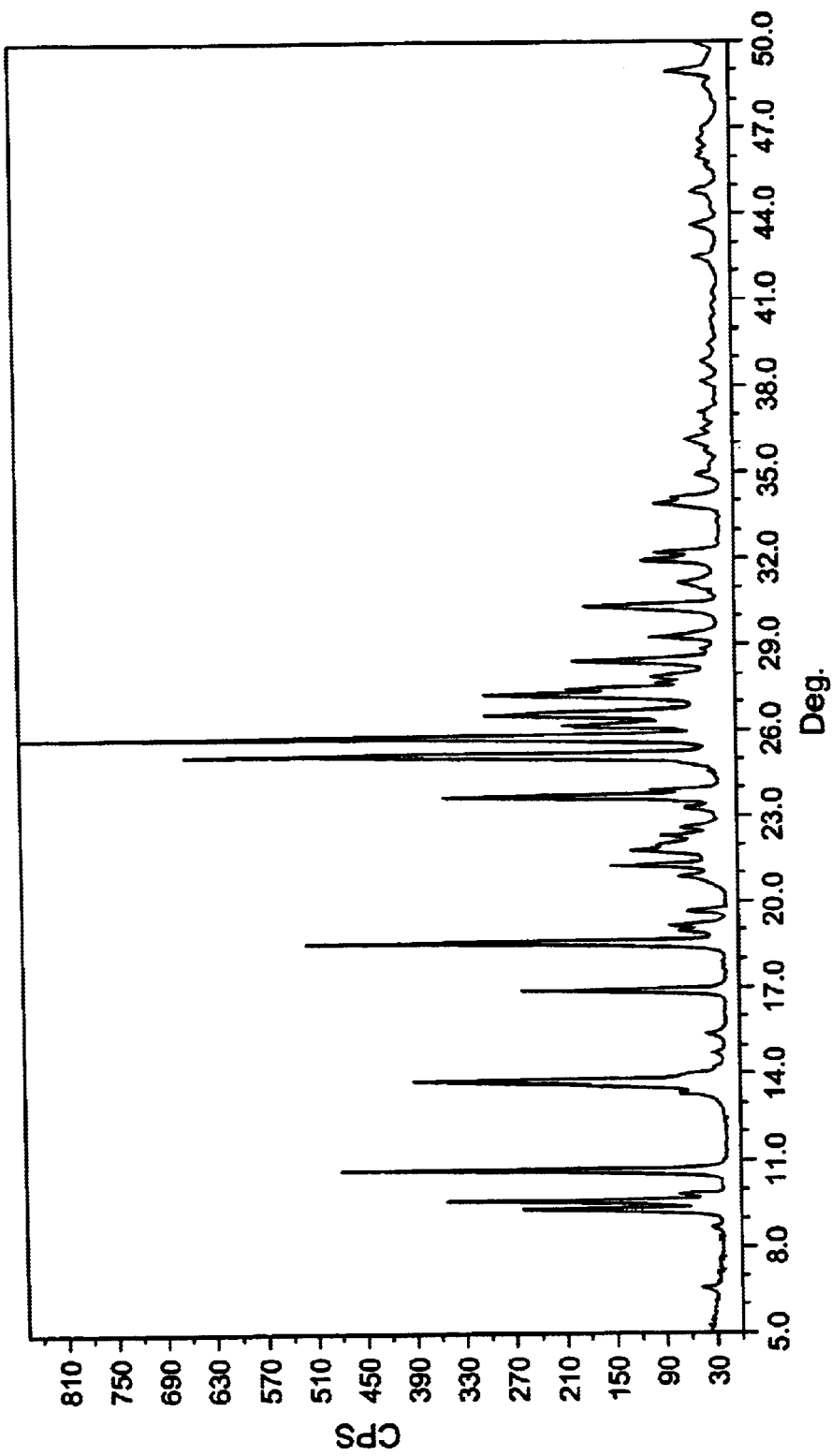
FIG. 6 shows the X-ray diffraction pattern of the as-synthesized product of Example 3.

The combined mixture was added to an autoclave and heated to 160° C. for 300 hours and subsequently heated to 180° C. for 132 hours. The product was then filtered and washed with water and dried overnight under an IR lamp. The powder pattern of the as-synthesized material is given in FIG. 6.

EXAMPLE 4

Synthesis of Aluminosilicate MCM-71

7 g of Colloidal Silica (30 wt %), Al(OH)$_3$ (Aluminum Hydroxide, solid), KOH (Potassium Hydroxide, 20 wt % solution) and distilled water were combined in the following ratio:

| | |
|---|---|
| Si/Al$_2$ | 22 |
| H$_2$O/Si | 30 |
| OH/Si | 0.375 |
| K$^+$/Si | 0.375 |

Figure 7:
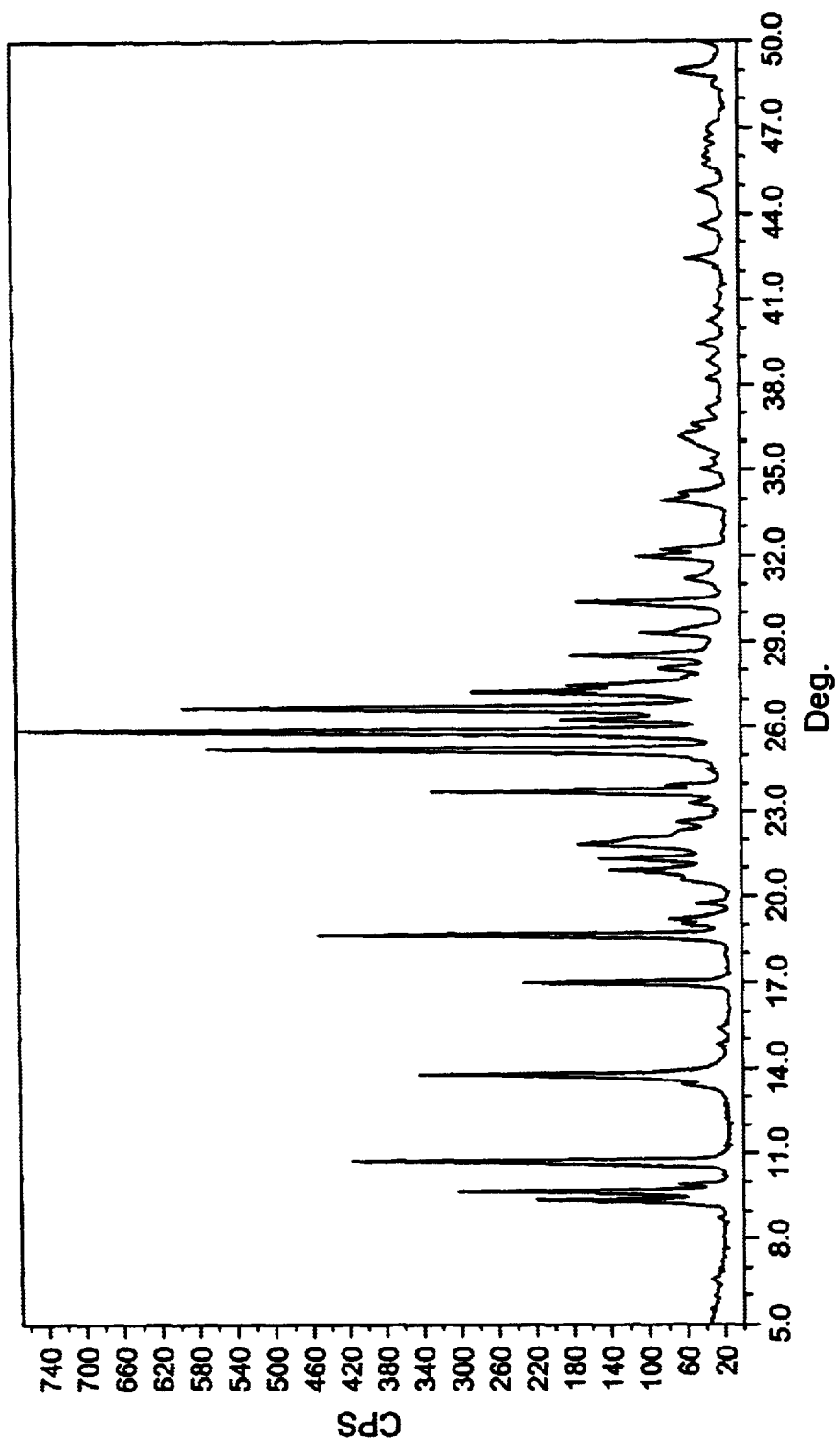
FIG. 7 shows the X-ray diffraction pattern of the as-synthesized product of Example 4.

The combined mixture was added to an autoclave and heated to 160° C. for 300 hours and subsequently heated to 180° C. for 132 hours. The product was then filtered and washed with water and dried overnight under an IR lamp. The powder pattern of the as-synthesized material is given in FIG. 7 and the corresponding peak list is compiled in Table 4.

TABLE 4

| d Å | 100 I/I |
|---|---|
| 13.45* | 1.8 |
| 10.17* | 1.2 |
| 9.51 | 24.1 |
| 9.24 | 35.3 |
| 8.99* | 5.9 |
| 8.32 | 51.0 |
| 6.63 | 6.3 |
| 6.47 | 39.3 |
| 6.02* | 1.0 |
| 5.77* | 1.5 |
| 5.24 | 29.6 |
| 4.96* | 0.32 |
| 4.77 | 59.5 |
| 4.67 | 6.2 |
| 4.63 | 7.6 |
| 4.50 | 4.4 |
| 4.31* | 6.1 |
| 4.25 | 13.6 |
| 4.17 | 15.7 |
| 4.07* | 18.5 |
| 4.03* | 11.6 |
| 3.98* | 5.4 |
| 3.93 | 5.1 |
| 3.81 | 3.6 |
| 3.75 | 43.2 |
| 3.71 | 9.2 |
| 3.63* | >1.0 |
| 3.53 | 74.8 |
| 3.446 | 100.0 |
| 3.39 | 20.9 |
| 3.34 | 74.9 |
| 3.27 | 32.7 |
| 3.22 | 19.9 |
| 3.19 | 6.8 |
| 3.13 | 30.0 |
| 3.05 | 11.2 |
| 3.03 | 4.6 |
| 2.945 | 20.5 |
| 2.865 | 4.2 |
| 2.796 | 11.9 |
| 2.774 | 9.4 |
| 2.639 | 8.7 |
| 2.620 | 6.3 |
| 2.561 | 2.8 |
| 2.483 | 3.6 |
| 2.455* | 3.8 |
| 2.417 | 1.3 |
| 2.355 | 2.4 |
| 2.317 | 1.6 |
| 2.281 | 3.3 |
| 2.239 | 2.0 |
| 2.213 | 1.3 |
| 2.183 | >1.0 |
| 2.128 | 5.0 |
| 2.072 | 3.3 |
| 2.018 | 3.3 |

TABLE 4-continued

| d Å | 100 I/I |
|---|---|
| 1.981 | 2.2 |
| 1.969 | 2.2 |
| 1.959 | 1.2 |
| 1.944 | 1.9 |
| 1.930 | 1.7 |
| 1.876 | 1.4 |

*denotes a probable impurity peak.

What is claimed is:

1. A synthetic porous crystalline material with a framework of tetrahedral atoms bridged by oxygen atoms, the tetrahedral atom framework being defined by a unit cell with atomic coordinates in nanometers shown in Table 1, wherein each coordinate position may vary within ±0.05 nm.

2. A synthetic porous crystalline material characterized by an X-ray diffraction pattern including values substantially as set forth in Table 2 of the specification.

3. The crystalline material of claim 2 having a composition comprising the molar relationship $$X_2O_3:(n)YO_2,$$

wherein n is at least about 2, X is a trivalent element, and Y is a tetravalent element.

4. The crystalline material of claim 3 having a composition, on an anhydrous basis and in terms of moles of oxides per n moles of $YO_2$, expressed by the formula:

$$(0.1-2)M_2O:(0-2)Q:X_2O_3:(n)YO_2$$

wherein M is alkali or alkaline earth metal and Q is an organic moiety.

5. The crystalline material of claim 4 wherein said Q comprises a cation derived from triethanolamine.

6. The crystalline material of claim 3 wherein X is a trivalent element selected from the group consisting of boron, iron, indium, gallium, aluminum, and a combination thereof; and Y is a tetravalent element selected from the group consisting of silicon, tin, titanium, germanium, and a combination thereof.

7. The crystalline material of claim 3 wherein X comprises aluminum and Y comprises silicon.

8. The crystalline material of claim 3 wherein n is about 5 to about 100.

9. A method for synthesizing crystalline material exhibiting a characteristic X-ray diffraction pattern including d-spacing maxima values shown in Table 2 which comprises (i) preparing a mixture capable of forming said material, said mixture comprising sources of alkali or alkaline earth metal (M), an oxide of trivalent element (X), an oxide of tetravalent element (Y) and water, having a composition, in terms of mole ratios, within the following ranges:

| | |
|---|---|
| $YO_2/X_2O_3$ | 2–100,000 |
| $H_2O/YO_2$ | 10–1000 |
| $OH^-/YO_2$ | 0.02–2 |
| $M/YO_2$ | 0.02–2 |

(ii) maintaining said mixture under sufficient conditions including a temperature of from about 100° C. to about 220° C. until crystals of said material are formed; and (iii) recovering said crystalline material from step (ii).

10. The method of claim 9 wherein said mixture has a composition, in terms of mole ratios, within the following ranges:

| | |
|---|---|
| $YO_2/X_2O_3$ | 5–100 |
| $H_2O/YO_2$ | 20–50 |
| $OH^-/YO_2$ | 0.1–0.8 |
| $M/YO_2$ | 0.1–0.8. |

11. The method of claim 9 wherein M is potassium.

12. The method of claim 9 wherein said mixture contains a directing agent (Q) comprising triethanolamine in an amount such that the molar ratio of $Q/YO_2$ is about 0.01 to about 2.0.

13. A process for converting a feedstock comprising organic compounds to conversion product which comprises contacting said feedstock at organic compound conversion conditions with a catalyst comprising an active form of the synthetic porous crystalline material of claim 1.

* * * * *